(12) United States Patent
Kim et al.

(10) Patent No.: US 9,115,020 B2
(45) Date of Patent: Aug. 25, 2015

(54) METHOD AND APPARATUS FOR MANUFACTURING A LOW MELTING POINT NANO GLASS POWDER

(75) Inventors: Hyung Sun Kim, Seoul (KR); Dong Wha Park, Seoul (KR); Sung Hwan Cho, Jecheon Si (KR); Sun Il Kim, Cheonan Si (KR); Won Kyung Lee, Incheon (KR); Hyun Jin Shim, Goyang Si (KR)

(73) Assignee: INHA—INDUSTRY PARTNERSHIP INSTITUTE, Incheon (KR)

( * ) Notice: Subject to any disclaimer, the term of this patent is extended or adjusted under 35 U.S.C. 154(b) by 0 days.

(21) Appl. No.: 14/353,059

(22) PCT Filed: Jun. 8, 2012

(86) PCT No.: PCT/KR2012/004547
§ 371 (c)(1),
(2), (4) Date: Apr. 21, 2014

(87) PCT Pub. No.: WO2013/058458
PCT Pub. Date: Apr. 25, 2013

(65) Prior Publication Data
US 2014/0243185 A1 Aug. 28, 2014

(30) Foreign Application Priority Data
Oct. 20, 2011 (KR) .................. 10-2011-0107326

(51) Int. Cl.
*C03B 19/14* (2006.01)
*C03C 3/145* (2006.01)
(Continued)

(52) U.S. Cl.
CPC .............. *C03B 19/14* (2013.01); *C01G 29/00* (2013.01); *C03B 19/1025* (2013.01); *C03B 19/1407* (2013.01); *C03C 3/145* (2013.01); *C03C 12/00* (2013.01); *C01P 2004/64* (2013.01); *C03B 2201/62* (2013.01)

(58) Field of Classification Search
USPC .............. 65/21.1; 501/52; 422/186; 423/617
See application file for complete search history.

(56) References Cited

U.S. PATENT DOCUMENTS

2003/0113481 A1* 6/2003 Huang et al. .................. 427/580
2005/0147752 A1 7/2005 Kodas et al.
(Continued)

FOREIGN PATENT DOCUMENTS

KR 10-2003-0080521 A 10/2003
KR 10-2008-0110223 A 12/2008
(Continued)

OTHER PUBLICATIONS

International Search Report for PCT/KR2012/004547 mailed Dec. 12, 2012 from Korean Intellectual Property Office.

*Primary Examiner* — Mark Halpern
(74) *Attorney, Agent, or Firm* — Sherr & Jiang, PLLC

(57) ABSTRACT

Disclosed is a method for manufacturing a low melting point nano glass powder. The method includes the steps of: preparing a bismuth-based low melting point glass powder precursor of a micro size, having bismuth (Bi) as the main ingredient; injecting the glass powder precursor into a reaction chamber of a plasma treatment device; applying thermal plasma via a direct current power source to the glass powder precursor injected into the reaction chamber, to vaporize the glass powder precursor; and generating nano glass powder having a nano size by quenching the gas generated by vaporizing the glass powder precursor.

9 Claims, 7 Drawing Sheets

(51) Int. Cl.
*C03C 12/00* (2006.01)
*C03B 19/10* (2006.01)
*C01G 29/00* (2006.01)

(56) References Cited

U.S. PATENT DOCUMENTS

2005/0199861 A1* 9/2005 Wu et al. .................. 252/518.1
2008/0044488 A1* 2/2008 Zimmer et al. ............... 424/600

FOREIGN PATENT DOCUMENTS

| KR | 10-2009-0067830 A | 6/2009 |
| KR | 10-2009-0075100 A | 7/2009 |
| WO | WO 98-19965 A1 | 5/1998 |

\* cited by examiner

| Constituents | RO | MO | Bi₂O₃ | B₂O₃ | Al₂O₃ |
|---|---|---|---|---|---|
| Before plasma processing (wt%) | 2.6 | 11.8 | 78.1 | 6.9 | 0.3 |
| After plasma processing (wt%) | 2.5 | 11.6 | 78.6 | 6.9 | 0.3 |
| Difference (wt%) | 0.1 | 0.2 | 0.5 | 0.0 | 0.0 |

# METHOD AND APPARATUS FOR MANUFACTURING A LOW MELTING POINT NANO GLASS POWDER

CROSS REFERENCE TO PRIOR APPLICATION

This application is a National Stage Patent Application of PCT International Patent Application No. PCT/KR2012/004547 (filed on Jun. 8, 2012) under 35 U.S.C. §371, which claims priority to Korean Patent Application No. 10-2011-0107326 (filed on Oct. 20, 2011), which are all hereby incorporated by reference in their entirety.

TECHNICAL FIELD

The present invention relates to a method and apparatus for preparing nano glass powders, and more particularly, to a method and apparatus for preparing low melting point nano glass powders, which makes it possible to prepare bismuth-based nano glass powders having bismuth (Bi) instead of conventional lead (Pb) as a main ingredient using thermal plasma generated by direct current power at a low sintering temperature, rapidly at a low cost, and without fear of polluting the environment.

BACKGROUND ART

In general, nano materials correspond to media that have diverse shapes and physical properties without being limited to specific material areas of metals, ceramic polymers, biomaterials, etc, and influence nanotechnology directly and indirectly. Nanopowders are expected to be widely applied to electronic, photoelectron and magnetism fields, biomedical, pharmaceutical and cosmetic fields, and industry fields of energy, catalyst and structure.

Meanwhile, glass powders among various materials have been frequently used until now in diverse industry fields such as electronics and energy fields, and compositions and sizes of the glass powders are very diverse according to their application fields. For instance, the glass powders have been utilized in various component materials including partitions and electrodes for PDP TVs that made a rapid growth along with LCD TVs while replacing conventional cathode-ray tube TVs, and the glass powders have also been used as sintering additives for electrodes of silicon solar cells. Although micro-sized glass powders have frequently been used until now, it is required to develop nano-sized glass powders in the future for the purpose of accomplishing miniaturization, high efficiency and high performance of electrical and electronic products. Low melting point glasses are glasses which have an operating temperature of 500 degrees C. or lower and have been used as functional component materials and sealants for electronic products. Typical low melting point glasses include lead (Pb) based glasses. However, since uses of the lead (Pb) based glasses are strictly regulated by RoHS certification due to environmental pollution problems, the development of Bi-based glass compositions as an alternative to the lead (Pb) based glasses has actively progressed.

Preparation processes of such glass powders are conventionally divided into a wet type process and a dry type process, and basically include determining composition ratios of raw materials, measuring and uniformly mixing the raw materials, heating the mixed raw materials at a melting temperature or higher to prepare a glass melt, and rapidly cooling the melt to prepare small cullets, so that a milling process is performed on the cullets. Then, it is possible to obtain powders having a size from several millimeters (mm) to several hundred micrometers (μm). Such a milling process is often performed by ball milling, wherein powders having a size from several millimeters (mm) to several hundred micrometers (μm) obtained from the milling process are milled again to obtain powders having a size of smaller than 10 μm.

Here, the process has a demerit in that the glass powders are exposed to the pollution due to alien substances or solvent components remaining on surfaces of frits although the wet type milling process has good milling efficiency. The process has problems in that the configuration of initial facilities requires a high investment cost and it is difficult to lower particle sizes of the powders to not greater than 1 μm although the dry type milling process is preferred in material industries since the process does not have the problems of the wet type milling process.

Meanwhile, techniques of preparing nano glass powders using plasma have recently been introduced. Such techniques of preparing nano glass powders using plasma are dry type techniques having great merits that spherical nano powders may be obtained in large quantities relatively simply and there are not any pollution problems. Upon further discussing the thermal plasma process, non-transferred arc and transferred arc using direct or alternating current according to a plasma source may be used, and argon or nitrogen gas as a plasma-generating gas is mainly used. Spherical nano powders may be obtained by injecting raw materials into plasma in a solid, liquid or gas form to instantaneously heat the raw materials by high temperature plasma, performing melting and evaporation processes on the heated raw materials, and cooling the resulting materials very rapidly at a radical temperature gradient while passing through a reaction tube. As a present known technique, a technique of preparing nano glass powders for BaO-based dielectrics that do not contain $Bi_2O_3$ or PbO using an RF thermal plasma process is introduced in Korean Laid-open Patent Publication No. 10-2009-0067830. Further, a process of preparing relatively high melting point borosilicate nano glass powders containing $SiO_2$ as a main constituent by using an RF plasma process is introduced in Korean Laid-open Patent Publication No. 10-2009-0075100.

As described above, although nano powders may be obtained in large quantities continuously and relatively easily by using the thermal plasma process, it is difficult to determine process variables exactly due to such a many process variables. Since process conditions may vary depending on the types of compositions, it has become a challenge that it is important to perform a quantitative comparison analysis on compositions before and after the process and variations in contents of the compositions.

Moreover, since a preparing technique of Bi-based nano glass powders, which have recently been received the limelight as an alternative to a PbO-based nano glass powder composition that is a conventional representative low melting point glass powder composition has not been introduced yet, it has been required to develop the technique.

DISCLOSURE

Technical Problem

The present invention is conceived to solve the aforementioned problems in the prior art. An object of the present invention is to provide a method and apparatus for preparing nano glass powders, which makes it possible to prepare bismuth-based nano glass powders containing bismuth (Bi) as a main constituent using thermal plasma generated by direct current power.

Technical Solution

According to an aspect of the present invention for achieving the objects, there is provided a method of preparing nano glass powders, which includes preparing a micro-sized bismuth based low melting point glass powder precursor containing bismuth as a main constituent; injecting the glass powder precursor into a reaction tube of a plasma processing apparatus; vaporizing the glass powder precursor by applying thermal plasma generated by direct current power to the glass powder precursor injected into the reaction tube; and producing nano-sized nano glass powders by rapidly cooling a gas formed when the glass powder precursor is vaporized.

Here, electric power applied to generate the thermal plasma may be 6 to 15 kW.

Further, an assist gas may be selectively injected into the reaction tube, the assist gas preserving an amorphous structure of the nano glass powders by suppressing reduction and crystallization of the produced nano glass powders.

Further, the assist gas may be oxygen gas.

Further, the glass powder precursor may include bismuth oxide ($Bi_2O_3$), aluminum oxide ($Al_2O_3$), boron oxide ($B_2O_3$), RO, and MO.

Further, the reaction tube may be manufactured into water-cooled double tubes, and the gas of the vaporized glass powder precursor may be brought into contact with the inner wall of the reaction tube and be rapidly cooled to form solidified nano glass powders.

Further, argon gas may be used as a plasma-generating gas for generating the thermal plasma, and a portion of the argon gas may be used as a carrier gas for carrying the glass powder precursor to the reaction tube.

Further, the argon gas may be mixed with nitrogen gas.

Further, the produced nano glass powders may have a size of 10 nm to 60 nm.

According to another aspect of the present invention, there is provided an apparatus for preparing nano glass powders, which includes a reaction tube having a cooling function to maintain a surface of an inner wall of the reaction tube at a low temperature; a process chamber installed to communicate with the reaction tube; a powder feeder connected with the reaction tube to feed a glass powder precursor as a raw material into the reaction tube; and a thermal plasma generator for vaporizing the raw material by applying thermal plasma to the raw material fed and injected into the reaction tube, wherein the raw material fed by the powder feeder is a micro-sized bismuth based glass powder precursor containing bismuth (Bi) as a main constituent, and the glass powder precursor is vaporized into a gas state by thermal plasma and then brought into contact with the inner wall of the reaction tube to be rapidly cooled, thereby producing solidified nano glass powders.

Here, the thermal plasma generator may use direct current power.

Further, electric power applied to generate the thermal plasma may be 6 to 15 kW.

Further, the glass powder precursor may include bismuth oxide ($Bi_2O_3$), aluminum oxide ($Al_2O_3$), boron oxide ($B_2O_3$), RO, and MO.

Furthermore, the apparatus may further include an assist gas feeder for selectively feeding an assist gas into the reaction tube, the assist gas preserving an amorphous structure of the nano glass powders by suppressing reduction and crystallization of the produced nano glass powders.

Further, the assist gas may be oxygen gas.

Further, the reaction tube may be formed in water-cooled double tubes in which cooling water circulates so that the reaction tube has a cooling function.

Furthermore, the apparatus may include an argon gas feeder for feeding argon gas to the thermal plasma generator and the powder feeder respectively so that a portion of the argon gas is used as a plasma-generating gas for generating the thermal plasma and a portion of the argon gas is used as a carrier gas for carrying the glass powder precursor.

Furthermore, the apparatus may further include a nitrogen gas feeder for mixing nitrogen gas with the argon gas.

Advantageous Effects

According to a method and apparatus for preparing nano glass powders according to the present invention, it is possible to prepare bismuth-based nano glass powders containing bismuth (Bi) instead of conventional lead (Pb) as a main constituent at a low calcining temperature inexpensively and promptly without a concern about the environmental pollution by using thermal plasma generated by direct current power.

In addition, the nano glass powders produced according to the present invention can be formed into a homogeneous thinner film due to a low calcining temperature and reduced porosities of the nano glass powders. Therefore, the nano glass powders may be used as sintering additives for silicon solar cell electrodes, pastes for manufacturing thick films of display electrodes, dielectrics, or additives of inkjet printing inks. Further, the nano glass powders may be used as sealants for PDPs, OLEDs, dye-sensitized solar cells (DSSCs), etc.

Further, according to the present invention, it is possible to obtain desired high quality products since compositions for the nano glass powders of the present invention are stable to such an extent that the compositions are almost not changed as compared with a composition for a micro-sized bismuth based low melting point glass powder precursor used as a raw material.

Also, the entire configuration according to the present invention can also be simplified by utilizing an inert gas used as a plasma-generating gas as a carrier gas for carrying the glass powder precursor.

BEST MODE

Hereinafter, preferred embodiments according to the technical spirits of the present invention will be described in detail with reference to the accompanying drawings.

The present invention is configured in such a way that thermal plasma generated by direct current power is used to produce bismuth-based nano glass powders containing bismuth (Bi) instead of conventional lead (Pb) as a main constituent at a low sintering temperature and to prepare the bismuth-based nano glass powders rapidly at low costs without fear of polluting the environment.

Further, according to the present invention, an assist gas is selectively used to allow the bismuth-based nano glass powders produced either to be crystallized or to have an amorphous structure.

Hereinafter, the configuration of an apparatus for preparing nano glass powders according to an embodiment of the present invention will be described.

Figure 1:
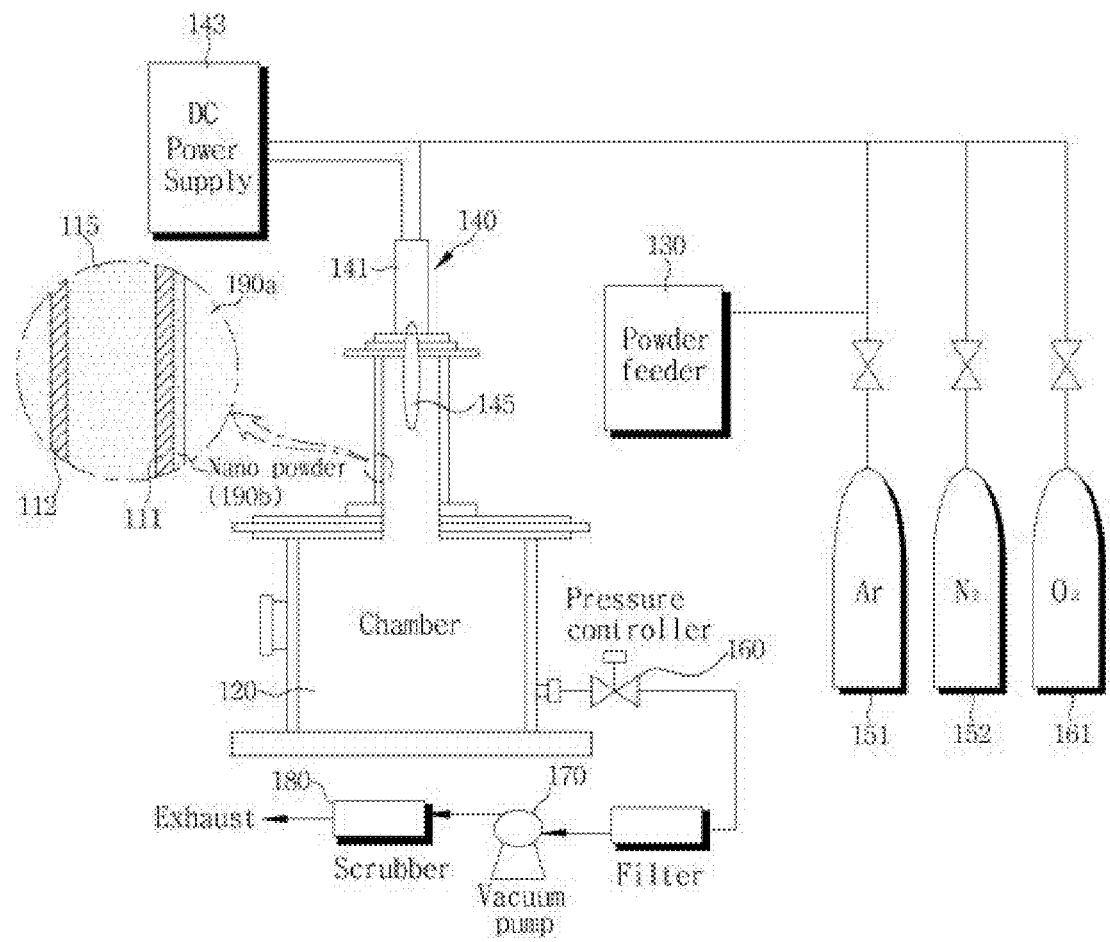
FIG. 1 is a block diagram illustrating the configuration of an apparatus for preparing nano glass powders according to an embodiment of the present invention.

FIG. 1 is a schematic block diagram illustrating the configuration of an apparatus for preparing nano glass powders according to an embodiment of the present invention.

As illustrated in the figure, an apparatus for preparing nano glass powders according to an embodiment of the present invention basically includes a reaction tube 110, a process chamber 120, a powder feeder 130, a thermal plasma generator 140, and an assist gas feeder 161. The preparation apparatus of the present invention having the configuration easily produces nano-sized glass powders by using direct current power suitable for a low calcining temperature, vaporizing a micro-sized bismuth based glass powder precursor as raw material containing bismuth (Bi) as a main constituent into a gas state, and then rapidly cooling the vaporized precursor.

Hereinafter, the configuration of the apparatus for preparing nano glass powders according to the embodiment of the present invention will be described in detail with a focus on the above-described respective components.

First, the reaction tube 110 serves to rapidly cool and solidify gas of a glass powder precursor vaporized by thermal plasma. To this end, the reaction tube 110 has a water-cooled structure which consists of double tubes of an inner wall 111 and an outer wall 112 spaced apart from each other and receives fresh cooling water 115 through a space therebetween to circulate. Therefore, instantly when the gas of the glass powder precursor that is rapidly vaporized by plasma heat in the reaction tube 110 is brought into contact with the surface of the inner wall 111 of the reaction tube 110, the vaporized gas is rapidly cooled and solidified to be deposited in the form of nano glass powders. The gas 190a of the vaporized glass powder precursor and nano glass powders 190b solidified and deposited on the inner wall of the reaction tube 110 are shown in an enlarged part of FIG. 1.

Further, the reaction tube 110 is formed to have a relatively small volume as compared with the process chamber 120, which is to bring a large amount of the glass powder precursor into contact with the inner wall as much as possible by narrowing an internal space of the reaction tube and diffusing the glass powder precursor toward the inner wall 111 of the reaction tube 110 not to other places immediately after the glass powder precursor is vaporized by thermal plasma.

The process chamber 120 is installed at the bottom side of the reaction tube 110 to be in communication therewith and functions as a temporary reservoir that temporarily collects a reaction byproduct generated from the reaction tube 110 in producing nano glass powders before the reaction byproduct is discharged to the outside. To this end, the process chamber 120 is connected to a vacuum pump 170 for vacuumizing an interior of the process chamber 120 and a scrubber 180 for scrubbing the reaction byproduct discharged from the process chamber 120 and discharging the reaction byproduct into the air. Further, a pressure controller 160 for controlling a pressure of the process chamber 120 created by the vacuum pump 170 is installed.

The powder feeder 130 is connected to the reaction tube 110 to inject a micro-sized bismuth based glass powder precursor as a raw material into the reaction tube 110. Here, the powder feeder 130 is connected to an argon gas feeder 151 so that argon gas is used as a carrier gas for carrying the glass powder precursor. Further, the glass powder precursor fed from the powder feeder 130 is powders of a quinary system consisting of bismuth oxide ($Bi_2O_3$), aluminum oxide ($Al_2O_3$), boron oxide ($B_2O_3$), RO, and MO, wherein R in RO designates an alkaline earth metal, and M in MO designates a transition metal. In order to prepare the micro-sized bismuth based glass powder precursor used as the raw material, currently commercially available products have only to be simply procured.

The thermal plasma generator 140 serves to apply thermal plasma to the raw material injected into the reaction tube 110 to instantaneously vaporize the raw material. To this end, the thermal plasma generator 140 includes a plasma torch 141 which is installed on the reaction tube 110 and generates a thermal plasma flame 145 and a DC power supply 143 which applies direct current power to the plasma torch 141. Therefore, the DC power supply 143 applies a required electric power of 6 to 15 kW to the plasma torch 141, and the plasma torch 141 receives power from the DC power supply 143 to generate the thermal plasma flame 145 reaching a temperature of 5,000 to 10,000 degrees K in the reaction tube 110.

As described above, the apparatus of the present invention is configured to use DC thermal plasma generated by the DC power supply 143, wherein there is a merit of enabling the environment-friendly process since the DC power supply 143 has a lower process cost and does not generate elements causing environmental pollution as compared with an radio frequency (RF) plasma device.

The assist gas feeder 161 is connected to the reaction tube 110 to selectively inject oxygen gas into the reaction tube 110. The oxygen gas selectively injected into the reaction tube 110 by the assist gas feeder 161 preserves the nano powders such that they have an amorphous structure by suppressing reduction and crystallization of the nano powders produced on the inner wall 111 of the reaction tube 110. Therefore, amorphous nano powders are obtained if the assist gas feeder 161 injects the oxygen gas into the reaction tube 110 when the nano powders are produced on the inner wall 111 of the reaction tube 110 while crystalline nano powders instead of the amorphous nano powders are obtained if the oxygen gas is not injected.

In the meantime, an undescribed nitrogen gas feeder 152 serves to feed nitrogen gas to the reaction tube 110 and the powder feeder 130, and the nitrogen gas fed from the nitrogen gas feeder 152 is mixed with the argon gas fed from the argon gas feeder 151 to be used as a plasma-generating and carrier gas.

Figure 2:
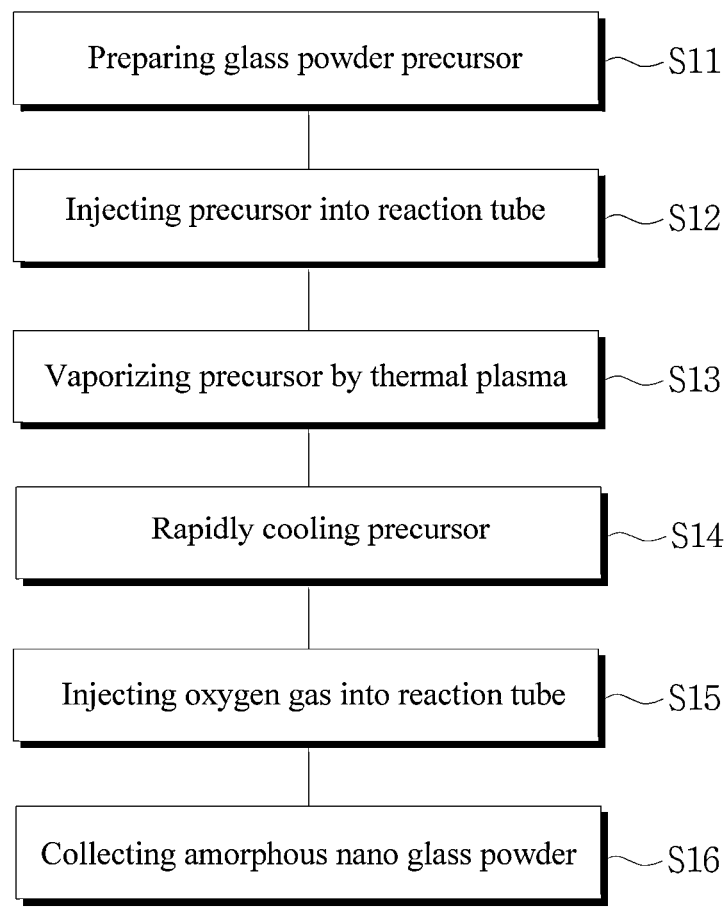
FIG. 2 is a flowchart illustrating a method for preparing nano glass powders according to an embodiment of the present invention.

Successively, a method for preparing nano glass powders according to an embodiment of the present invention will be described with reference to FIG. 2. FIG. 2 is a flowchart illustrating a method for preparing nano glass powders according to an embodiment of the present invention.

As illustrated in FIG. 2, a method for preparing nano glass powders according to an embodiment of the present invention includes step S11 of preparing a glass powder precursor, step S12 of injecting the precursor into a reaction tube, step S13 of vaporizing the precursor by thermal plasma, step S14 of rapidly cooling the precursor, step S15 of injecting oxygen gas, and step S16 of collecting amorphous nano glass powders.

A micro-sized bismuth based low melting point glass powder precursor containing bismuth (Bi) as a main constituent is prepared in step S11 of preparing the glass powder precursor. The glass powder precursor required here is powders of a quinary system consisting of bismuth oxide ($Bi_2O_3$), aluminum oxide ($Al_2O_3$), boron oxide ($B_2O_3$), RO, and MO, wherein R in RO designates an alkaline earth metal, and M in MO designates a transition metal. Since the precursor may be commercially available relatively inexpensively as compared with a nano-sized glass powder precursor, commercially available products have only to be simply procured without an additional preparation process.

Thereafter, the glass powder precursor is injected into a reaction tube 110 of the plasma processing apparatus in step S12 of injecting the precursor into the reaction tube. To this end, the powder feeder 130 feeds the reaction tube 110 with the glass powder precursor prepared in the previous step using argon gas as a carrier gas. Since the argon gas that is an inert gas does not have a direct influence on the reaction, the argon gas is used as a carrier gas so that the glass powder precursor is smoothly injected. Further, nitrogen gas or other inert gases may be used as the carrier gas in such a way that the argon gas is replaced or partially mixed with the nitrogen or other inert gases.

Then, high temperature thermal plasma is applied to the glass powder precursor injected into the reaction tube 110 to vaporize the glass powder precursor in step S13 of vaporizing the precursor by thermal plasma. To this end, the thermal plasma generator 140 is used. The DC power supply 143 of the thermal plasma generator 140 applies an electric power of 6 to 15 kW to the plasma torch 141, and the plasma torch 141 receives the power from the DC power supply 143 and generates a thermal plasma flame 145 reaching a temperature of 5,000 to 10,000 degrees K in the reaction tube 110. The glass powder precursor is instantaneously melted, vaporized, and changed into the gas state by the generated thermal plasma flame 145.

Thereafter, the gas generated by vaporizing the glass powder precursor is rapidly cooled to produce nano-sized glass powders in step S14 of rapidly cooling the precursor. In this procedure, a water-cooled structure of the reaction tube 110 is used to maintain the inner wall 111 at a low temperature state while receiving fresh cooling water 115 in a space between the inner wall 111 and the outer wall 112 to circulate. That is, the gas of the glass powder precursor vaporized by high temperature thermal plasma is mostly brought into contact with the inner wall 111 of the reaction tube 110 while being diffused into the internal space of the reaction tube 110. At this time, the gas of the glass powder precursor is rapidly cooled, solidified, and deposited in the form of a film instantaneously when the gas is brought into contact with the inner wall 111 of the reaction tube 110 having low temperature. Accordingly, nano glass powders are produced in such a form that they are deposited on the inner wall 111 of the reaction tube 110.

When observing the produced nano glass powders through a scanning electron microscope, it can be confirmed that spherical nano glass powders having a size ranging from 10 nm to 60 nm are produced. Further, when examining a change between compositions before and after plasma processing by inductively coupled plasma-optical emission spectrometer (ICP-OES) analysis, the change in compositions is represented as a value of within 0.5%. Therefore, it can be confirmed that there is hardly any change in compositions between the micro-sized glass powder precursor used as a raw material and the newly produced nano glass powders.

Step S14 of rapidly cooling the precursor and step S15 of injecting oxygen gas into the reaction tube are performed at the same time. In step S15 of injecting oxygen gas into the reaction tube, oxygen gas that is an assist gas is fed to the reaction tube 110 by the assist gas feeder 161. The oxygen gas preserves the nano glass powders to have an amorphous structure by suppressing reduction and crystallization of nano glass powders produced on the inner wall 111 of the reaction tube 110.

Thereafter, in step S16 of collecting amorphous nano glass powders, solid nano glass powders deposited on the inner wall 111 of the reaction tube 110 are collected after finishing all the processes. Although small amounts of powders are presented in the process chamber 120 in communication with the bottom of the reaction tube 110, the powders are either non-reactants, or large and small irregularly shaped powders. Such irregularly shaped powders are those which are grown in the process of moving the vaporized gas of the glass powder precursor to the process chamber 120 after forming nuclei in the reaction tube 110 and are not an object to be collected.

Experimental Example 1

Preparation of Nano Glass Powder Using DC Thermal Plasma Device

Nano glass powders were prepared using the apparatus for preparing nano glass powders according to the embodiment of the present invention illustrated in FIG. 1.

Here, all the processes were performed at an atmospheric pressure of 760 Torr, and the DC power supply 143 applied an electric power of 6 kW and an electric current of 300 A to the plasma torch 141 to generate the thermal plasma flame 145. Further, argon gas was constantly fed to the plasma torch 141 at a flow rate of 15 L/min so as to function as a plasma-generating and carrier gas. Then, oxygen gas was fed into the reaction tube 110 at a flow rate of 0.5 L/min.

Meanwhile, experiments were performed under slightly changed operational conditions. At this time, the electric power applied to the plasma torch 141 by the DC power supply 143 was increased from 6 to 11 kW, and nitrogen gas was mixed with the argon gas while being additionally fed at a flow rate of 2 L/min. However, the oxygen gas was not injected.

Operational conditions applied to Experimental Example 1 were comparatively exhibited in the following Table 1:

TABLE 1

| Supply Gas | Electric Power | Flow Amount | Assist Gas |
| --- | --- | --- | --- |
| Argon Gas | 6 kW | 15 L/min | 0.5 L/min of Oxygen |
| Mixed Gas of Argon and Nitrogen | 11 kW | 15 L/min of Argon 2 L/min of Nitrogen | — |

In cases of all the experiments to which the above-described two operational conditions were applied, the nano glass powders 190b produced by vaporizing, cooling, and solidifying the micro-sized bismuth based glass powder precursor injected into the reaction tube 110 could be obtained in a deposited form on the inner wall 111 of the reaction tube 110.

Here, although small amounts of powders were presented in the process chamber 120 in communication with the reaction tube 110, the powders were mostly non-reactants, or relatively large and irregularly shaped powders which were formed by additional growth of the vaporized gas 190a of the glass powder precursor while the vaporized gas 190a moved to the process chamber 120 after forming nuclei in the reaction tube. Therefore, the powders were not nano glass powders 190b to be collected.

Experimental Example 2

Observation of Size and Shape of Nano Glass Powders 190b

After collecting nano glass powders 190b produced in the reaction tube 110 and deposited on the inner wall 111 of the reaction tube 110, sizes and shapes of the collected nano glass powders 190b were observed and analyzed using a scanning electron microscope (SEM).

Figure 4:
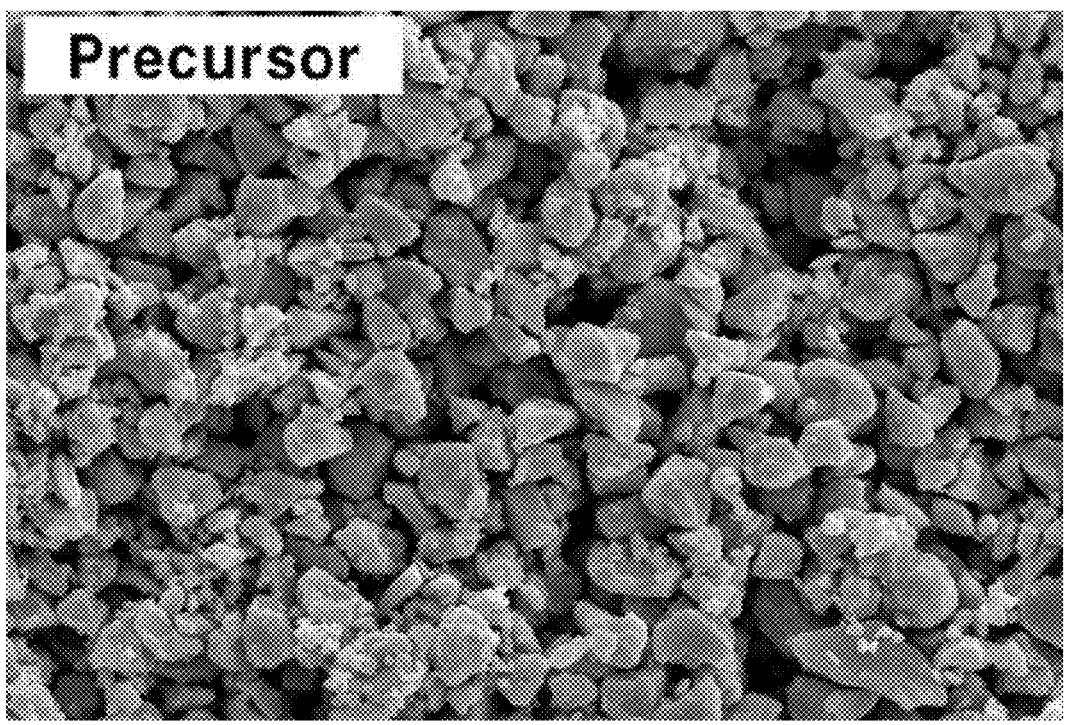
FIG. 4 is an SEM photograph of a micro-sized bismuth based glass powder precursor used as a raw material for preparing nano glass powders in the present invention.
Figure 5:
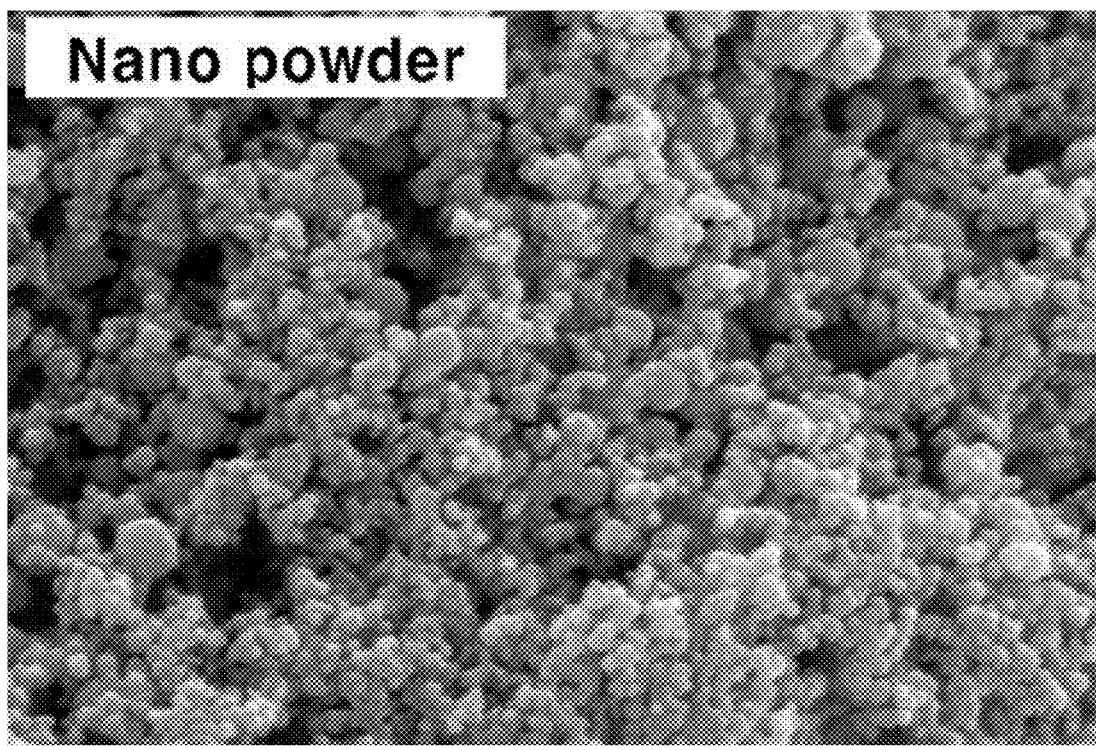
FIGS. 5 and 6 are SEM photographs of spherical nano glass powders prepared through a method for preparing nano glass powders according to embodiments of the present invention.
Figure 6:
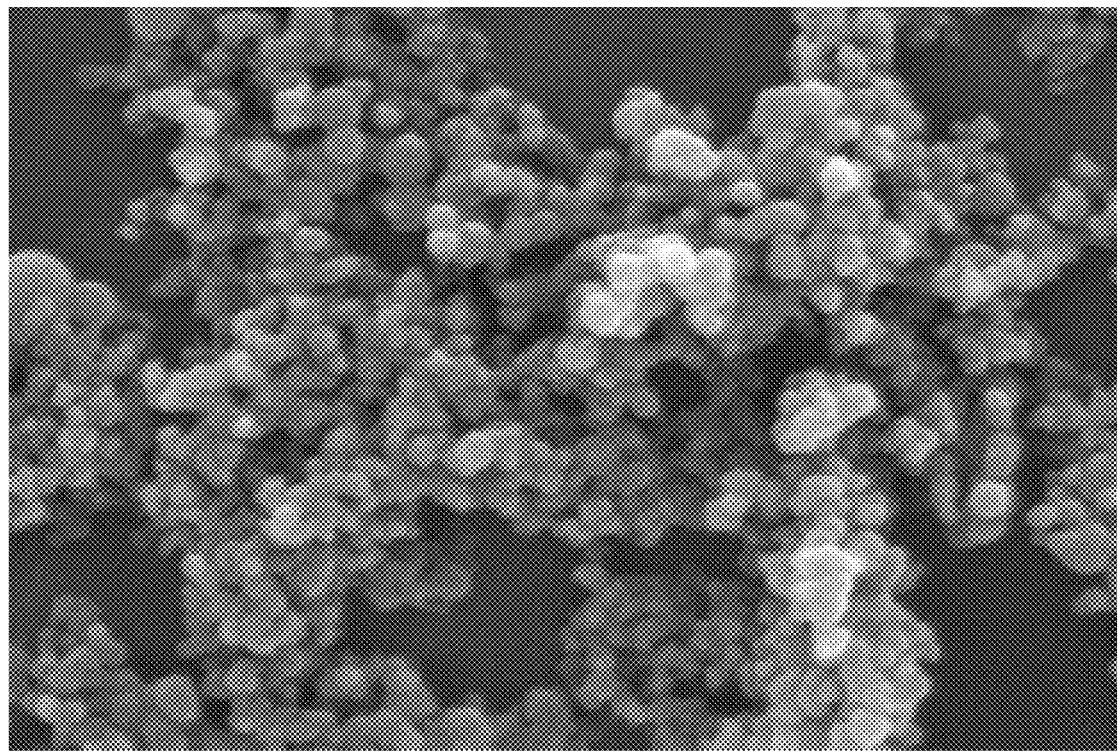

Accordingly, although the glass powder precursor has a micro-sized irregular shape as shown in FIG. 4, it could be confirmed that the nano glass powders 190b prepared through the above-described Experimental Example 1 were nano-sized spherical powders as can be seen in FIGS. 5 and 6.

Experimental Example 3

Analysis of Crystal Structure

The crystal structures were analyzed by using a powder X-ray diffraction (PXRD) analyzer to compare crystal structures of a micro-sized glass powder precursor and nano glass powders 190b prepared through the above-described Experimental Example 1.

Figures 7, 8:
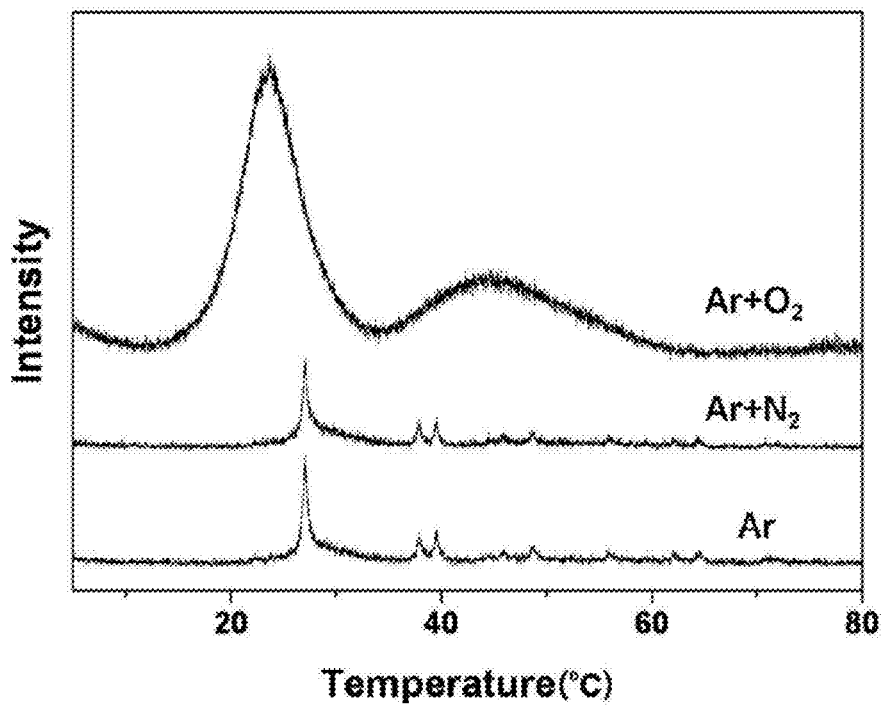
FIG. 7 is an X-ray diffraction diagram of nano powders prepared depending on types of plasma-generating gases and assist gases in a method for preparing nano glass powders according to embodiments of the present invention.
FIG. 8 is a table representing variations in compositions for powders before or after the process obtained through the ICP-OES (Inductively Coupled Plasma-Optical Emission Spectrometer) analysis in a method for preparing nano glass powders according to embodiments of the present invention.

The analysis results are shown in a graph of FIG. 7. As shown in the graph of FIG. 7, it could be confirmed that the nano glass powders 190b were reduced in both cases (lower two graph lines) in which oxygen gas as an assist gas was not injected into the reaction tube 110. When measuring sizes of the reduced nano glass powders 190b from the graph by using a Scherrer's Formula, it could be confirmed that the measured sizes of the nano glass powder 190b was from 10 nm to 20 nm.

On the contrary, it could be confirmed that an amorphous structure was preserved without reduction of the nano glass powders 190b when the oxygen gas as the assist gas was injected into the reaction tube 110 (the uppermost graph line).

Experimental Example 4

Analysis of Change in Composition and Constituent

Analyses were performed using an inductively coupled plasma-optical emission spectrometer (ICP-OES) in order to compare changes in compositions and constituents between a glass powder precursor and nano glass powders 190b prepared through Experimental Example 1.

As results of the analyses, it could be confirmed as shown in the comparative table of FIG. 8 that extremely small changes of less than 0.5% by weight only occurred in all the five constituents of a micro-sized bismuth based low melting point glass powder precursor containing bismuth (Bi) as a main constituent as compared with constituents of the newly produced nano glass powders 190b. As it can be confirmed through these experiments, high quality nano glass powders 190b can be stably obtained by using the micro-sized bismuth based low melting point glass powder precursor as a raw material.

MODE FOR INVENTION

Figure 3:
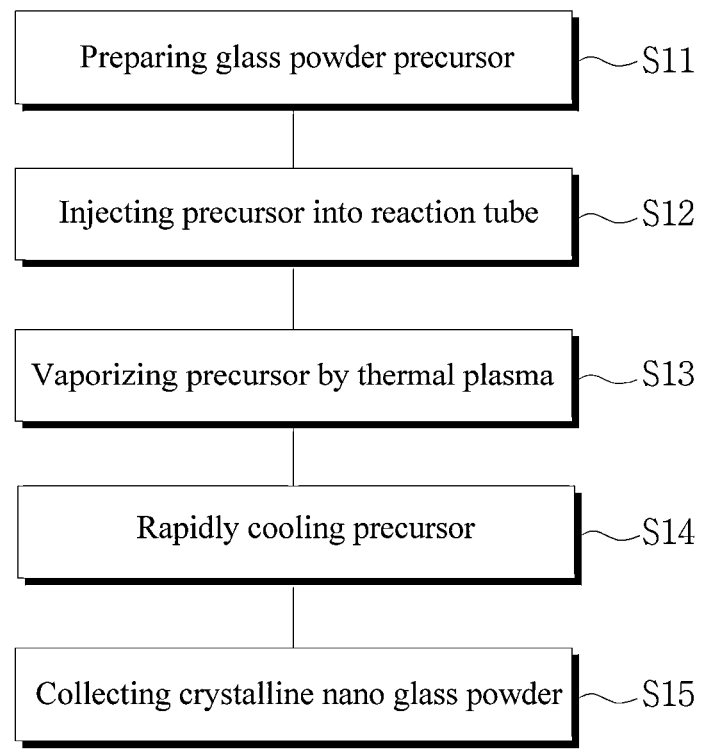
FIG. 3 is a flowchart illustrating a method for preparing nano glass powders according to a modified embodiment of the present invention.

Successively, a method for preparing nano glass powders according to a modified embodiment of the present invention that can be performed from a different standpoint will be described with reference to FIG. 3. FIG. 3 is a flowchart illustrating a method for preparing nano glass powders according to a modified embodiment of the present invention.

As shown in the figure, a method for preparing nano glass powders according to a modified embodiment of the present invention includes step S11 of preparing a glass powder precursor, step S12 of injecting the precursor into a reaction tube, step S13 of vaporizing the precursor by thermal plasma, step S14 of rapidly cooling the precursor, and step S17 of collecting crystalline nano glass powders. As compared with the previous embodiment, the modified embodiment excludes step S15 of injecting oxygen gas as an assist gas when producing nano glass powders but includes step S17 of collecting crystalline nano glass powders to produce crystalline nano glass powders instead of amorphous nano glass powders.

As described above, the present invention makes it possible to reduce the nano glass powders to crystalline nano glass powders or control the nano glass powders to amorphous nano glass powders by selectively injecting the oxygen gas instead of unconditionally injecting oxygen gas as an assist gas that inhibits the crystallization of nano glass powders. Therefore, the obtained nano glass powders can be widely used in a crystalline and amorphous form as materials for bonding electrodes and a substrate within a silicon solar cell, an electron transfer path in the silicon solar cell, displays, and various products in electrical and electronic fields.

While the preferred embodiments of the present invention have been described, various changes, modifications and equivalents can be made thereto according to the present invention. It will be apparent that the above-described embodiments can be appropriately modified and applied to the present invention in the same manner. Therefore, the above descriptions are not to limit the scope of the present invention defined by the appended claims.

The invention claimed is:

1. A method of preparing nano glass powders, comprising:
preparing a micro-sized bismuth based low melting point glass powder precursor containing bismuth as a main constituent;
injecting the glass powder precursor into a reaction tube of a plasma processing apparatus;
vaporizing the glass powder precursor by applying thermal plasma generated by direct current power to the glass powder precursor injected into the reaction tube; and
producing nano-sized nano glass powders by rapidly cooling a gas formed when the glass powder precursor is vaporized.

2. The method according to claim 1, wherein electric power applied to generate the thermal plasma is 6 to 15 kW.

3. The method according to claim 1, wherein an assist gas is selectively injected into the reaction tube, the assist gas preserving an amorphous structure of the nano glass powders by suppressing reduction and crystallization of the produced nano glass powders.

4. The method according to claim 3, wherein the assist gas is oxygen gas.

5. The method according to claim 1, wherein the glass powder precursor comprises bismuth oxide ($Bi_2O_3$), aluminum oxide ($Al_2O_3$) and boron oxide ($B_2O_3$), and further comprises at least one type of constituents selected from RO (R designates an alkaline earth metal) and MO (M designates a transition metal).

6. The method according to claim 1, wherein the reaction tube is manufactured into water-cooled double tubes, and the gas of the vaporized glass powder precursor is brought into contact with the inner wall of the reaction tube and is rapidly cooled to form solidified nano glass powders.

7. The method according to claim 1, wherein argon gas is used as a plasma-generating gas for generating the thermal plasma, and a portion of the argon gas is used as a carrier gas for carrying the glass powder precursor to the reaction tube.

8. The method according to claim 7, wherein the argon gas is mixed with nitrogen gas.

9. The method according to claim 1, wherein the produced nano glass powders have a size of 10 nm to 60 nm.

* * * * *